//////////////// US010110519B2

(12) United States Patent
Cai et al.

(10) Patent No.: US 10,110,519 B2
(45) Date of Patent: Oct. 23, 2018

(54) METHOD, APPARATUS AND STORAGE MEDIUM FOR SHARING INFORMATION

(71) Applicant: TENCENT TECHNOLOGY (SHENZHEN) COMPANY LIMITED, Guangdong (CN)

(72) Inventors: Runda Cai, Guangdong (CN); Qing Huang, Guangdong (CN); Zhijie Zhou, Guangdong (CN); Liangliang Fan, Guangdong (CN); Runjia Huang, Guangdong (CN); Xueqin Lin, Guangdong (CN); Ganrong Yang, Guangdong (CN); Kunfeng Rong, Guangdong (CN); Xing Liang, Guangdong (CN); Haiwen Chen, Guangdong (CN); Jingqiong Feng, Guangdong (CN); Tianqing Huang, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 591 days.

(21) Appl. No.: 14/489,336

(22) Filed: Sep. 17, 2014

(65) Prior Publication Data
US 2015/0006659 A1    Jan. 1, 2015

Related U.S. Application Data

(63) Continuation of application No. PCT/CN2013/072116, filed on Mar. 4, 2013.

(30) Foreign Application Priority Data

Mar. 21, 2012  (CN) .......................... 2012 1 0076384

(51) Int. Cl.
*G06F 15/173*  (2006.01)
*H04L 12/58*  (2006.01)
*G06Q 50/00*  (2012.01)

(52) U.S. Cl.
CPC ............. *H04L 51/04* (2013.01); *G06Q 50/01* (2013.01)

(58) Field of Classification Search
CPC ......... H04L 51/04; H04L 12/58; G06Q 50/01; G06Q 50/00
See application file for complete search history.

(56) References Cited

U.S. PATENT DOCUMENTS 7,383,308 B1    6/2008   Groves et al.
7,613,472 B2 *  11/2009  Northcutt ........ H04M 1/274516
                                                    379/93.23
(Continued)

FOREIGN PATENT DOCUMENTS

CN       1779705 A      5/2006
CN     101227528 A      7/2008
(Continued)

OTHER PUBLICATIONS

Office Action issued in Chinese Patent Application No. 201210076384.6, dated Jun. 5, 2014.
(Continued)

*Primary Examiner* — Cheikh Ndiaye
(74) *Attorney, Agent, or Firm* — Knobbe Martens Olson & Bear LLP

(57) ABSTRACT

Various examples provide a method, an apparatus and a storage medium for sharing information. According to the method, a user to be shared is identified in an address book in an instant messaging (IM) client; an electronic business card is generated by using basic information of the to-be-shared user in the IM system, and is sent to a receiving
(Continued)

client. Various examples of the present disclosure also provide a method and an apparatus for receiving shared information.

9 Claims, 3 Drawing Sheets

(56) References Cited

U.S. PATENT DOCUMENTS

| | | | |
|---|---|---|---|
| 2005/0289474 A1* | 12/2005 | Master | G06F 3/0481 |
| | | | 715/765 |
| 2006/0239234 A1 | 10/2006 | Rao et al. | |
| 2006/0293904 A1* | 12/2006 | Ramanathan | G06Q 10/00 |
| | | | 709/206 |
| 2006/0293905 A1* | 12/2006 | Ramanathan | G06Q 10/10 |
| | | | 709/206 |
| 2007/0152036 A1* | 7/2007 | Daigle | H04L 12/58 |
| | | | 235/380 |
| 2008/0125148 A1* | 5/2008 | Zhao | H04M 1/274516 |
| | | | 455/466 |
| 2008/0133677 A1 | 6/2008 | Pattabhiraman et al. | |
| 2009/0072025 A1* | 3/2009 | Daigle | H04L 12/58 |
| | | | 235/380 |
| 2009/0305730 A1* | 12/2009 | Herz | H04L 12/5895 |
| | | | 455/466 |
| 2010/0082761 A1* | 4/2010 | Nguyenphu | G06F 17/30165 |
| | | | 709/206 |
| 2012/0330993 A1* | 12/2012 | Faiman | G06F 17/30675 |
| | | | 707/769 |

FOREIGN PATENT DOCUMENTS

| | | |
|---|---|---|
| CN | 101335720 A | 12/2008 |
| CN | 101399872 A | 4/2009 |
| CN | 102026110 A | 4/2011 |
| CN | 102123356 A | 7/2011 |
| WO | WO 2009/130389 A1 | 10/2009 |

OTHER PUBLICATIONS

International Preliminary Report on Patentability and Written Opinion of the International Searching Authority for International Application No. PCT/CN2013/072116, dated Sep. 23, 2014, in 8 pages.
Extended European Search Report for European Patent Application No. 13764358.1, dated Mar. 6, 2015, in 7 pages.
International Search Report for PCT/CN2013/0712116 dated Jun. 6, 2013, 2 pages.
Office Action Issued in Canadian Patent Application No. 2,867,051 dated Jan. 13, 2017 in 5 pages.

* cited by examiner

METHOD, APPARATUS AND STORAGE MEDIUM FOR SHARING INFORMATION

RELATED DOCUMENT INFORMATION

This application is a continuation application of pending International Application PCT/CN2013/072116, filed on Mar. 4, 2013, which claims priority to Chinese Patent Application 201210076384.6, filed on Mar. 21, 2012, all of which are incorporated by reference in their entireties to the extent there is no inconsistency with the present disclosure.

TECHNICAL FIELD

The present disclosure relates to instant messaging (IM), and particularly, to a method, an apparatus and a storage medium for sharing information.

BACKGROUND

Instant messaging (IM) refers to a service that enables sending and receiving Internet messages in real time. Appeared in 1998, IM grows to integrate more and more service systems to provide more functions than messaging, e.g., email, blog, music, video, game and searching and the like. IM is no longer a mere chatting tool, but has evolved into a comprehensive information platform for communication, information, entertainment, searching, e-commerce, cooperation within office and providing services to enterprises and so on. IM differs from e-mail in that IM communications are in real time.

The vCard (electronic business card) is a general format for personal business cards proposed by companies including Apple, IBM in 1995. A vCard includes personal information such as contact information, address and the like of a person. At present, the vCard technique is widely used in email systems. A sender of an email attaches a personal business card in the vCard format to an email to be sent, so that the receiver can obtain the vCard of the sender when the email is received and optionally click on the vCard to add the sender into the receiver's address book.

SUMMARY

Examples of the present disclosure provide a method, an apparatus and a storage medium for sharing information to share buddy information among contacts in an IM system. The technical schemes are as follows.

According to an example, a method for sharing information may include:

a to-be-shared user is identified in an address book in an instant messaging (IM) client;

an electronic business card is generated by using basic information of the to-be-shared user in an IM system;

the electronic business card is sent to a receiving client via instant messaging.

According to an example, an apparatus for sharing information may include:

an information determining module, adapted to identify a to-be-shared user in an address book in an instant messaging (IM) client;

a business card generating module, adapted to generate an electronic business card by using basic information of the to-be-shared user in an IM system determined by the information determining module; and a business card sending module, adapted to send the electronic business card generated by the business card generating module to a receiving client via instant messaging.

According to an example, a storage medium includes computer-executable instructions for executing a method for sharing information. The method may include:

a to-be-shared user is identified in an address book in an IM client;

an electronic business card is generated by using basic information of the to-be-shared user in an IM system;

the electronic business card is sent to a receiving client via instant messaging.

According to the method, the apparatus and the storage medium, a to-be-shared user is identified in an address book in an IM client; an electronic business card is generated by using basic information of the to-be-shared user in an IM system and sent to a receiving client. Therefore, IM clients are enabled to share buddy information via IM messages transporting electronic business cards. It becomes easy for IM clients to recommend and share buddies, which facilitates extension of the social network of users.

BRIEF DESCRIPTION OF THE DRAWINGS

In order to make the mechanisms according to examples of the present invention more clearly, the following is a brief introduction of the drawings used in description of the examples. Obviously, the following drawings are merely some of the examples, and based on which other drawings can be obtained by those skilled in the art without doing any inventive work.

DETAILED DESCRIPTIONS

Technical schemes provided by examples of the present disclosure are hereinafter described clearly and completely in detail with reference to the accompanying drawings. It should be understood that the embodiments described are merely some examples of the present disclosure, not all of the examples. Based on the examples of the present disclosure, other examples obtained by those skilled in the art without any inventive work done are still within the protection scope of the present disclosure.

The examples are hereinafter described with reference to the accompanying drawings and embodiments.

Figure 1:
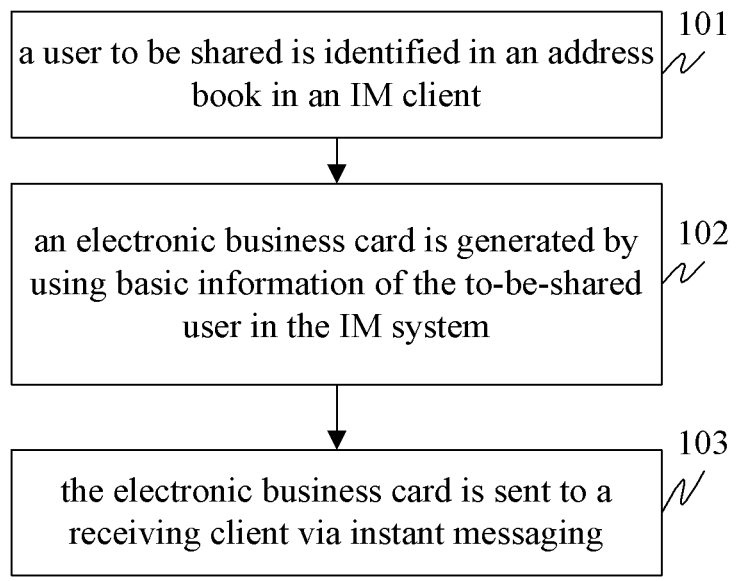
FIG. 1 is a flowchart illustrating a method for sharing information in accordance with an example of the present disclosure.

FIG. 1 is a flowchart illustrating a method for sharing information. This example describes operations performed by a sending client of an electronic business card. The method may include the following procedures.

At block 101, a to-be-shared user is identified in an address book in an IM client.

At block 102, an electronic business card is generated by using basic information of the to-be-shared user in an IM system.

At block 103, the electronic business card is sent to a receiving client via instant messaging.

In an example, an IM client, e.g., QQ client, Fetion client, WeChat client, and the like, usually stores an address book of a user. The user may establish a social relation with buddies by using the address book. When the user needs to share information of a buddy in the address book with another buddy, the buddy whose information is to be shared may be firstly identified in the address book according to an example. Then, an electronic business card may be generated by using basic information of the buddy.

In an example, the procedure of generating the electronic business card by using basic information of the to-be-shared user in an IM system in block 102 may include the following procedures.

Basic information of the to-be-shared user in the IM system is obtained. The basic information may include one or multiple of: a head portrait, a user name, a nickname, a gender, an age, a birth date, a zodiac sign, a location and a quotation of the to-be-shared user.

The basic information is combined to generate an electronic business card in an xml format.

In an example, when the IM system is a QQ system, the basic information of the to-be-shared user in the IM system may be basic information of a QQ user; when the IM system is a Fetion system or WeChat system, the basic information of the to-be-shared user in the IM system may be user basic information in the Fetion system or the WeChat system.

In an example, the receiving client of the electronic business card may be the client of one or multiple buddies/contacts. Therefore, the sending client of the electronic business card may extend his/her social relations and his/her buddies' social relations by using the method for sharing information of various examples of the present disclosure.

Figure 2:
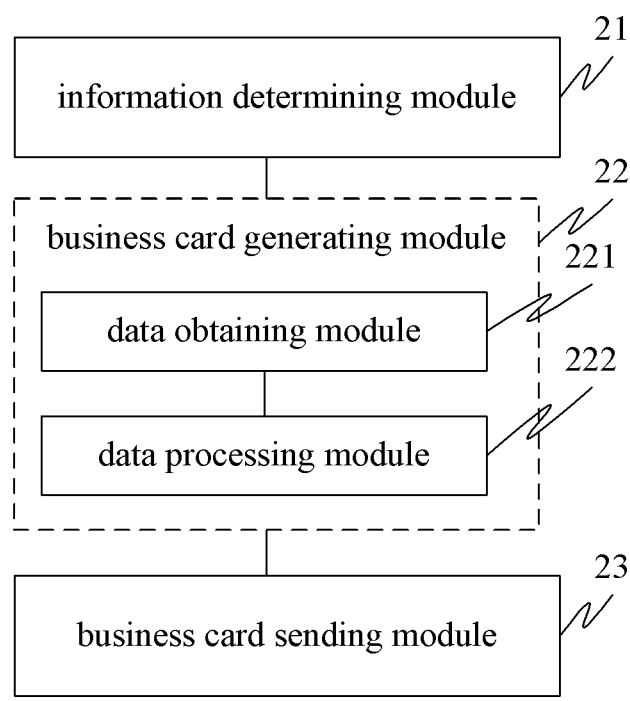
FIG. 2 is a schematic diagram illustrating modules of an apparatus for sharing information in accordance with an example of the present disclosure.

FIG. 2 is a schematic diagram illustrating modules of an apparatus for sharing information. The apparatus may include the following components.

An information determining module 21 may identify a to-be-shared user in an address book in an instant messaging (IM) client.

A business card generating module 22 may generate an electronic business card by using basic information of the to-be-shared user determined by the information determining module in an IM system.

A business card sending module 23 may send the electronic business card generated by the business card generating module to a receiving client via instant messaging.

In an example, the business card generating module 22 may include the following components.

An information obtaining module 221 may obtain basic information of the to-be-shared user in the IM system. The basic information may include one or multiple of: a head portrait, a user name, a nickname, a gender, an age, a birth date, a zodiac sign, a location and a quotation of the to-be-shared user.

A data processing module 222 may combine the basic information obtained by the information obtaining module to generate the electronic business card in an xml format.

The apparatus is corresponding to the method as shown in FIG. 1, thus includes the same or corresponding technical features. The apparatus is for implementing the method shown in FIG. 1, thus is not described further herein.

Figure 3:
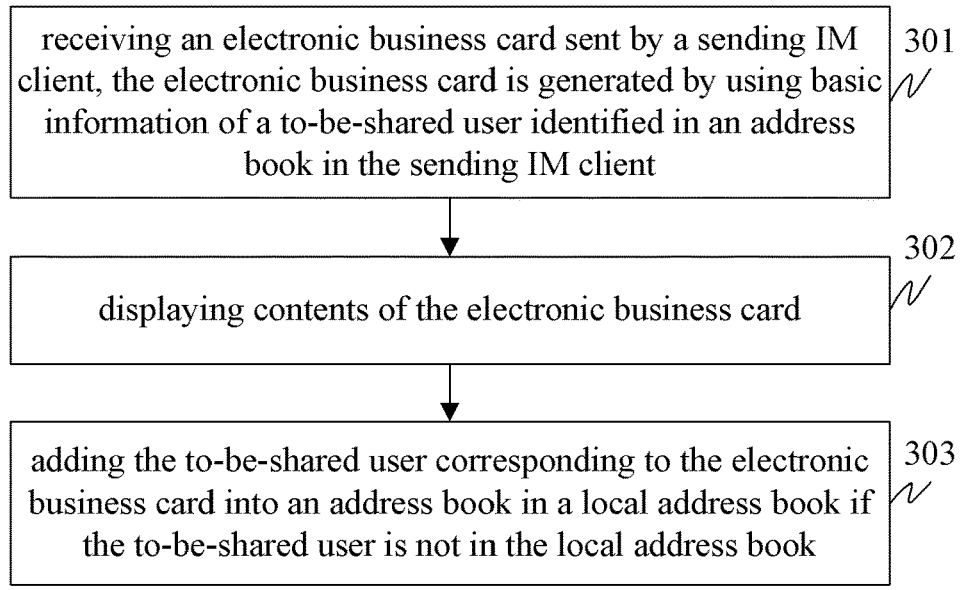
FIG. 3 is a flowchart illustrating a method for receiving shared information in accordance with an example of the present disclosure.

FIG. 3 is a flowchart illustrating a method for receiving shared information. This example describes operations performed by a receiving client of an electronic business card. The method may include the following procedures.

At block 301, an electronic business card is received from a sending IM client. The electronic business card is generated by the sending IM client using basic information of a to-be-shared user identified in an address book in the sending IM client.

At block 302, contents of the electronic business card are displayed.

At block 303, the to-be-shared user corresponding to the electronic business card is added into a local address book if the to-be-shared user is not in the local address book.

The example describes the technical scheme from the perspective of a receiving client of an electronic business card which receives the electronic business card from a sending IM client. The electronic business card is used for carrying shared buddy information in an address book in the sending client so that the receiving client can obtain user information of the to-be-shared user.

In an example, the electronic business card received by the receiving client is in the xml format.

In an example, the procedure of displaying contents in the electronic business card in block 302 may include the following procedures.

Contents in the received electronic business card are parsed. The electronic business card may include one or multiple of: a head portrait, a user name, a nickname, a gender, an age, a birth date, a zodiac sign, a location and a quotation of the to-be-shared user.

The parsed contents of the electronic business card are displayed by using a format pre-defined or customized for the electronic business card.

In an example, the electronic business card received by the receiving client is in the xml format. In order to make the electronic business card appear much simpler and clearer to the user of the receiving client, the electronic business card in the xml format may be drawn as an image of a business card. In an example, a conventional method may be adopted to draw an electronic business card in the form of an image by using information in data fields of the electronic business card in the xml format. The image of the electronic business card may be in a pre-defined format or a customized format.

In an example, the method may also include the following procedures.

The electronic business card being displayed is closed in response to a determination that the user corresponding to the electronic business card is not in a local address book and the user does not meet a condition of adding the user as a buddy.

In addition, the receiving client may select to update buddy information in the local address book based on information in the electronic business card in response to a determination that the user corresponding to the electronic business card is in the local address book.

Figure 4:
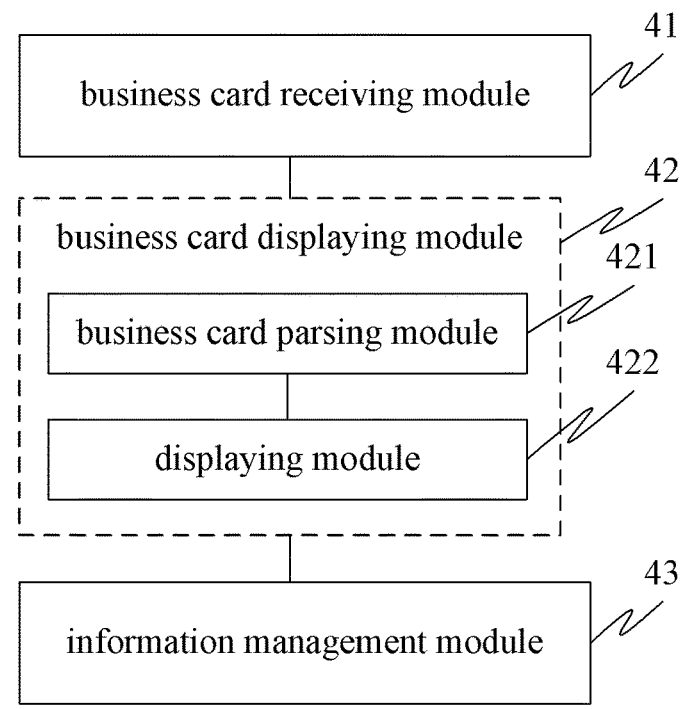
FIG. 4 is a schematic diagram illustrating modules of an apparatus for receiving shared information in accordance with an example of the present disclosure.

FIG. 4 is a schematic diagram illustrating modules of an apparatus for receiving shared information. The apparatus may include the following components.

A business card receiving module 41 receives an electronic business card from a sending IM client. The electronic business card is generated by the sending IM client using basic information of a to-be-shared user identified in an address book in the sending IM client.

A business card displaying module 42 displays contents of the electronic business card received by the business card receiving module.

An information managing module 43 adds the to-be-shared user corresponding to the electronic business card into an address book in the apparatus if the to-be-shared user is not in the address book in the apparatus.

In an example, the business card displaying module 42 may include the following components.

A business card parsing module 421 parses contents of the received electronic business card. The electronic business card may include one or multiple of: a head portrait, a user name, a nickname, a gender, an age, a birth date, a zodiac sign, a location and a quotation of the to-be-shared user.

A displaying module 422 displays the parsed contents of the electronic business card according to a format pre-defined or customized for the electronic business card.

In an example, the information managing module may close the electronic business card being displayed in response to a determination that the user corresponding to the electronic business card is not in the address book in the apparatus and the user does not meet a condition of adding the user as buddy.

The apparatus is corresponding to the method as shown in FIG. 3, thus includes the same or corresponding technical features. The apparatus is for implementing the method shown in FIG. 3, thus is not described further herein.

Figure 5:
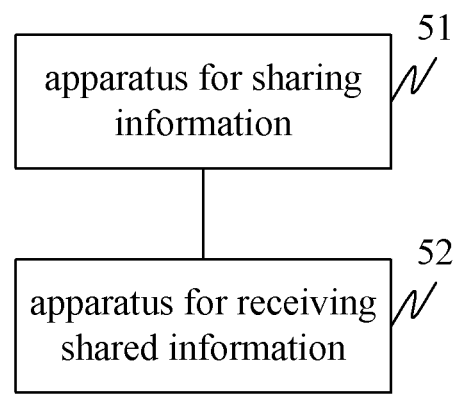
FIG. 5 is a schematic diagram illustrating a structure of a system for sharing information in accordance with an example of the present disclosure.

FIG. 5 is a schematic diagram illustrating a system for sharing information according to an example. The system may include the above apparatus 51 for sharing information as shown in FIG. 2 and the apparatus 52 for receiving shared information as shown in FIG. 4.

The following describes an example of a method for sharing information. The method may be implemented in an IM system.

At block 600, a sending client of an electronic business card enables a function for sharing information.

At block 601, the sending client determines a user to be shared from an address book in the sending client.

At block 602, an electronic business card in an xml format is generated by using basic information of the to-be-shared user in the IM system.

The basic information may include one or multiple of a head portrait, a user name, a nickname, a gender, an age, a birth date, a zodiac sign, a location and a quotation of the to-be-shared user.

At block 603, the electronic business card is sent to a receiving client via instant messaging.

At block 604, the receiving client receives the electronic business card in the xml format sent by the sending IM client.

At block 605, the receiving client parses contents of the received electronic business card. The electronic business card may include one or multiple of: a head portrait, a user name, a nickname, a gender, an age, a birth date, a zodiac sign, a location and a quotation of the to-be-shared user.

At block 606, the receiving client displays the parsed contents of the electronic business card according to a format pre-defined or customized for the electronic business card.

At block 607, the receiving client makes a judgment as to whether the user corresponding to the electronic business card is within an address book in the receiving client.

If the user is in the address book, the receiving client adds the user into the address book.

In an example, the receiving client may close the electronic business card being displayed in response to a determination that the user corresponding to the electronic business card is not in the address book in the receiving client and the user does not meet a condition of adding the user as a buddy.

In an example, the receiving client may select to update buddy information in the address book in the receiving client by using information in the electronic business card in response to a determination that the user corresponding to the electronic business card is in the address book.

Therefore, IM clients are enabled to share buddy information via IM messages delivering electronic business cards. It becomes easy for IM clients to recommend and share buddies, which facilitates extension of social network of users. Buddy information is presented to a receiving client in the form of an electronic business card which is simple and clear for viewers, thus user experience can be improved.

Those skilled in the art can understand that some or all of the steps of the methods provided by the embodiments may be implemented by hardware controlled by software. The software may be stored in a computer-readable storage medium.

It should be understood that in the above processes and structures, not all of the procedures and modules are necessary. Certain procedures or modules may be omitted according to the needs. The order of the procedures is not fixed, and can be adjusted according to the needs. Those skilled in the art can understand the modules in the apparatus of FIG. 2 or FIG. 4 may be located in the apparatus as described in the embodiments, or may be located in one or more apparatuses. The modules may be combined into one module, or may be further divided into multiple sub modules.

Through the above description, those skilled in the art may understand that the examples of the present disclosure may be implemented by hardware or by a hardware platform together with software including machine readable instructions stored in a non-transitory storage medium. Thus, the examples may be embodied by a software product.

In various examples, the hardware may be implemented by dedicated hardware or hardware executing machine readable instructions. For example, the hardware may comprise dedicated circuitry or logic that is permanently configured (e.g., as a special-purpose processor, such as a field programmable gate array (FPGA) or an application-specific integrated circuit (ASIC)) to perform certain operations. The hardware may also comprise programmable logic or circuitry (e.g., as encompassed within a general-purpose processor or other programmable processor) that is temporarily configured by software to perform certain operations.

Machine readable instructions for the modules shown in FIG. 2 or 4 may be stored in a non-transitory computer readable medium and may cause an operating system running in a computer to implement part or all of the operations described herein. The non-transitory computer readable medium may be a storage device in an extension board inserted in the computer or a storage in an extension unit connected to the computer. In this example, a CPU in the extension board or the extension unit executes at least part of the operations according to the instructions.

The non-transitory computer readable medium may include floppy disk, hard drive, magneto-optical disk, compact disk (such as CD-ROM, CD-R, CD-RW, DVD-ROM, DVD-RAM, DVD-RW, DVD+RW), magnetic tape drive, Flash card, ROM and so on. Optionally, the program code may be downloaded from a server computer via a communication network.

The foregoing is only preferred embodiments of the present invention. The protection scope of the present invention, however, is not limited to the above description. Any alteration or substitution that is within the technical scope disclosed by the present invention and can easily occur to those skilled in the art should be covered in the protection scope of the present invention. Therefore, the protection scope of the present invention should be according to the claims.

The invention claimed is:

1. A method for sharing information, comprising:
identifying, by a terminal device, a to-be-shared user in an address book in an instant messaging (IM) client;
obtaining, by the terminal device, the basic information of the to-be-shared user from an IM system, the basic information is personal information registered by the to-be-shared user into the IM system;
generating, by the terminal device, an electronic business card by using the basic information of the to-be-shared user, all of information contained in the electronic business card is obtained from the basic information;
sending, by the terminal device, the electronic business card to a receiving client via instant messaging;
receiving, by the terminal device, a second electronic business card from a sending IM client, wherein the second electronic business card is generated by the sending IM client using second basic information of a second to-be-shared user identified in an address book in the sending IM client;
displaying contents of the second electronic business card; and
terminating displaying the second electronic business card being displayed in response to a determination that a second user corresponding to the second electronic business card is not in the local address book and the second user does not meet a condition of adding the second user as buddy.

2. The method of claim 1,
wherein the basic information comprises at least one of: a head portrait, a user name, a nickname, a gender, an age, a birth date, a zodiac sign, a location and a quotation of the to-be-shared user;
wherein the generating an electronic business card by using basic information of the to-be-shared user in an IM system comprises: combining the basic information to generate an electronic business card in an xml format.

3. The method of claim 1, further comprising:
adding a second user corresponding to the second electronic business card into a local address book if the second user is not in the local address book.

4. The method of claim 3, wherein the displaying contents of the second electronic business card comprises:
parsing contents of the second electronic business card; wherein the second electronic business card comprises at least one of: a head portrait, a user name, a nickname, a gender, an age, a birth date, a zodiac sign, a location and a quotation of the to-be-shared user;
displaying the parsed contents of the second electronic business card according to a format pre-defined or customized for the electronic business card.

5. An apparatus for sharing information, comprising at least one processor and memory, the memory includes instructions executable by the at least one processor to:
identify a to-be-shared user in an address book in an instant messaging (IM) client;
obtain basic information of the to-be-shared user in an IM system, the basic information is personal information registered by the to-be-shared user into the IM system;
generate an electronic business card by using the basic information of the to-be-shared user, all of information contained in the electronic business card is obtained from the basic information; and
send the electronic business card to a receiving client via instant messaging;
receive a second electronic business card from a sending IM client, wherein the second electronic business card is generated by the sending IM client using second basic information of a second to-be-shared user identified in an address book in the sending IM client;
display contents of the second electronic business card received; and
terminate displaying the second electronic business card being displayed in response to a determination that a second user corresponding to the second electronic business card is not in the address book in the apparatus and the second user does not meet a condition of adding the second user as buddy.

6. The apparatus of claims 5, wherein the basic information comprises at least one of: a head portrait, a user name, a nickname, a gender, an age, a birth date, a zodiac sign, a location and a quotation of the to-be-shared user, the instructions are executable by the at least one processor to:
combine the basic information to generate the electronic business card in an xml format.

7. The apparatus of claim 5, wherein the instructions are executable by the at least one processor to:
add a second user corresponding to the second electronic business card into an address book in the apparatus if the second user is not in the address book in the apparatus.

8. The apparatus of claims 7, wherein the instructions are executable by the at least one processor to:
parse contents of the received second electronic business card which comprises at least one of: a head portrait, a user name, a nickname, a gender, an age, a birth date, a zodiac sign, a location and a quotation of the to-be-shared user; and
display the parsed contents of the second electronic business card according to a format pre-defined or customized for the second electronic business card.

9. One or multiple non-transitory storage mediums comprising computer-executable instructions for executing a method for sharing information, the method comprising:
identifying a to-be-shared user in an address book in an instant messaging (IM) client;
obtaining the basic information of the to-be-shared user from an IM system, the basic personal information is information registered by the to-be-shared user into the IM system;
generating an electronic business card by using basic information of the to-be-shared user, all of information contained in the electronic business card is obtained from the basic information;
sending the electronic business card to a receiving client via instant messaging;
receiving, by the terminal device, a second electronic business card from a sending IM client, wherein the second electronic business card is generated by the sending IM client using second basic information of a second to-be-shared user identified in an address book in the sending IM client;
displaying contents of the second electronic business card; and
terminating displaying the second electronic business card being displayed in response to a determination that a second user corresponding to the second electronic business card is not in the local address book and the second user does not meet a condition of adding the second user as buddy.

* * * * *